United States Patent [19]

Maurice et al.

[11] Patent Number: 4,857,819
[45] Date of Patent: Aug. 15, 1989

[54] CONNECTION OF STATIC INVERTER TO A RUNNING MOTOR

[75] Inventors: James Maurice; David J. Collins, both of Swindon, Wilts; Michael O. Hall, Gloucester; Peter D. McLoughlin, Swindon, Wilts, all of United Kingdom

[73] Assignee: Emerson Electric Co., Santa Ana, Calif.

[21] Appl. No.: 307,433

[22] Filed: Oct. 1, 1981

[51] Int. Cl.$^4$ ............................................. H02P 1/30
[52] U.S. Cl. .................................................... 318/778
[58] Field of Search ............... 318/452, 453, 459, 707, 318/705, 778, 798–803, 809; 361/23

[56] References Cited

U.S. PATENT DOCUMENTS

| | | | |
|---|---|---|---|
| 3,317,805 | 5/1967 | Kay et al. | 318/805 |
| 3,440,509 | 4/1969 | Tomeo et al. | 318/707 |
| 3,581,179 | 5/1971 | Jones | 318/452 |
| 3,584,279 | 6/1971 | Krauthanier et al. | 318/808 |
| 3,670,224 | 6/1972 | Jensen | 318/779 |
| 3,908,130 | 9/1975 | Lafuze | 318/778 X |
| 4,030,878 | 6/1977 | Kunath | 318/459 X |
| 4,119,897 | 10/1978 | Skoog | 318/459 X |
| 4,371,823 | 2/1983 | Lohest | 318/705 |
| 4,409,533 | 10/1983 | Kawabata | 318/778 |
| 4,451,112 | 5/1984 | Hattori et al. | 318/806 |

OTHER PUBLICATIONS

Mueller et al., "Static Variable Frequency Starting and Drive System for Large Synchronous Motors", Conference: Industry Industry Applications Society, IEEE JAS Annual Meeting, Cleveland, OH, USA (30 Sep.–4 Oct. 1979).

*Primary Examiner*—David Smith, Jr.
*Assistant Examiner*—Richard M. Moose
*Attorney, Agent, or Firm*—Lyon & Lyon

[57] ABSTRACT

The present invention is directed to a method and apparatus for connecting a static inverter to a free-running motor, wherein the inverter is supplied with D.C. power by a regulator-controlled rectifier. An oscillator connected to both the rectifier regulator and the inverter governs the frequency of the three-phase inverter output, while voltage feedback from the inverter output to the rectifier regulator is employed to establish a proper volts/hertz output characteristic in the inverter output waveform. During the connection process, a synchronizing circuit causes the oscillator to generate a high pulse rate signal which raises the inverter output frequency to a level above that associated with the rotational speed of the free-running motor. Simultaneously, the D.C. output of the rectifier is clamped by the current regulator to current-limit the inverter output. The inverter is subsequently connected to the free-running motor and the inverter output frequency is allowed to decrease gradually. When the frequency of the inverter output equal the rotational speed of the motor, the motor impedance increases substantially to create a voltage rise in the inverter output, followed by phase equalization between the inverter output and the back e.m.f. of the motor. In this manner, smooth, synchronous connection of the inverter to the rotating motor is achieved.

7 Claims, 6 Drawing Sheets

CONNECTION OF STATIC INVERTER TO A RUNNING MOTOR

DESCRIPTION

1. Field of the Invention

The present invention relates generally to motor control apparatus, and more particularly to apparatus involving control of large induction motors.

2. Background of the Invention

Connection of a power source, such as a three phase inverter, to a rotating motor has in the past been a difficult and complex task because of the necessity of matching the rotating frequency of the motor. Although circuits have existed which permitted the motor to be successfully energized while rotating, the usual solution has required complex phasing circuits to supply electrical energy to the motor in the proper manner.

As a result, there has been a need for a device or method for connecting a static inverter to a rotating motor which has not involved the use of such complex circuitry, while at the same time not injuring the system.

SUMMARY OF THE INVENTION

The present invention provides a deceptively simple solution to the foregoing problem. It is well known that the impedance of a rotating motor increases dramatically when the frequency of the rotating motor equals the frequency of a test signal, and is otherwise relatively low. In taking advantage of this discovery, a device for generating and monitoring such a test signal is incorporated into a substantially conventional inverter. A switching circuit which is responsive to the monitoring device is also included to permit the inverter to be automatically connected at the proper moment, thus ensuring a safe and simple connection to the rotating motor.

It is therefore one object of the present invention to provide an improved method for connecting a static inverter to a rotating motor.

It is another object of the present invention to provide improved apparatus for connecting a static inverter to a rotating motor.

It is yet another object of the present invention to provide a device for connecting a static inverter to a rotating motor which does not require significant revision of existing equipment.

These and other objects of the present invention will be better appreciated from the following Detailed Description of the Invention, taken together with the appended drawings, in which FIG. 1 schematically illustrates in block diagram form the system of the present invention as it would be connected to an exemplary three-phase induction motor;

DETAILED DESCRIPTION OF THE INVENTION

Figure 1:
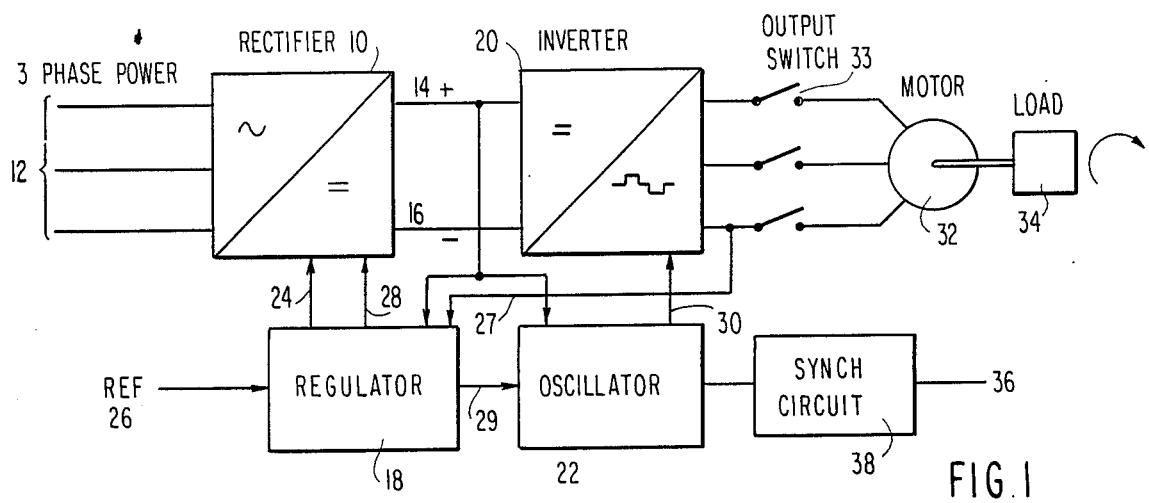

Referring first to FIG. 1, an exemplary arrangement of the system of the present invention is illustrated therein. More particularly, conventional three phase power is supplied to a conventional rectifier 10 by means of lines 12. The rectifier 10 may be of the type which is commercially available from the assignee of the present invention for use with its AS 4000 regulator. The rectifier 10 provides an positive and negative outputs on lines 14 and 16. The positive output 14 is provided to a regulator 18, inverter 20 and oscillator 22, while the negative output 16 is provided to the inverter 20.

The regulator 18, which may be of the AS 4000 type available from the assignee of the present invention, functions to regulate the drive output voltage, and thereby maintain the proper volts/hertz output characteristic. Those skilled in the art will appreciate that the correct volts/hertz characteristic requires that the output pulsewidth vary inversely with voltage so that essentially constant flux is provided to the rotating motor. In addition, the regulator 18 monitors the DC current being drawn from the rectifier by the remainder of the system, and provides a current limit function which includes a drive shutdown in the event of excessive current demand. The regulator 18 thus provides a control signal to the rectifier 10 via line 24. The regulator 18 receives a frequency reference signal 26 which is used in connection with the maintenance of the proper volts/hertz characteristic. In addition, the regulator 18 monitors the output voltage by means of a signal provided on a line 27, and provides a frequency control signal to the oscillator 22 on a line 29.

In addition, the regulator 18 provides its primary output on line 28, which is provided as another input to the rectifier 10. The output on line 28 is used as a control signal by the rectifier 10 to control the conduction angle of the SCRs included within the rectifier 10. As a result, the signal on the line 28 determines the output voltage level of the system, and more particularly the output signal provided by the rectifier 10 to the inverter 20 and the oscillator 22.

The oscillator 22 receives the output signal 14 from the rectifier 10 and in turn supplies to the inverter 20, on a line 30, a variable frequency pulse rate which determines the speed of a conventional motor 32 (or motors) connected to the inverter 20 through output switches 33. The motor 32 in turn drives a load 34 in a conventional manner. In an important addition to the oscillator 22, an additional input 36, together with synchronization circuitry 38 described in greater detail hereinafter, is provided which controls the frequency of the signal provided to the inverter on the line 20 during synchronization only, and permits normal operation of the system at all other times.

Referring more specifically to the synchronization system of the present invention, when it is required to synchronize the system of the present invention with the speed of a rotating motor, a control signal is applied to the input 36, which in turn activates the synch circuitry 38. As a result, the inverter 20 is connected to the free running motor 32 with the current maintained at the limit which exists when the system is fully loaded, and the output frequency of the inverter held to a maximum. Because the impedance of the motor is low, and the inverter output is current limited to a relatively low value, the voltage at the motor is low and the flux level in the motor is held to a commensurate low value.

With the frequency of the oscillator output forced to the maximum by the synch circuit 38, the frequency of the inverter output is above that of the motor. The synch circuit 38 then permits the signal on the line 30 to decrease in a controlled manner, which similarly decreases the frequency of the waveform supplied to the motor 30.

Until the frequency of the inverter output equals the rotational speed of the motor, the current levels in the system change only due to minor second order effects. However, when such equality is reached, the impedance of the motor increases substantially, thereby allowing the voltage to rise in accordance with Ohm's law. As a result, the system of the present invention allows for a smooth connection of the inverter to the rotating motor by determining when the frequency and phase of the inverter output are the same as the back e.m.f. of the motor.

Figure 2A:
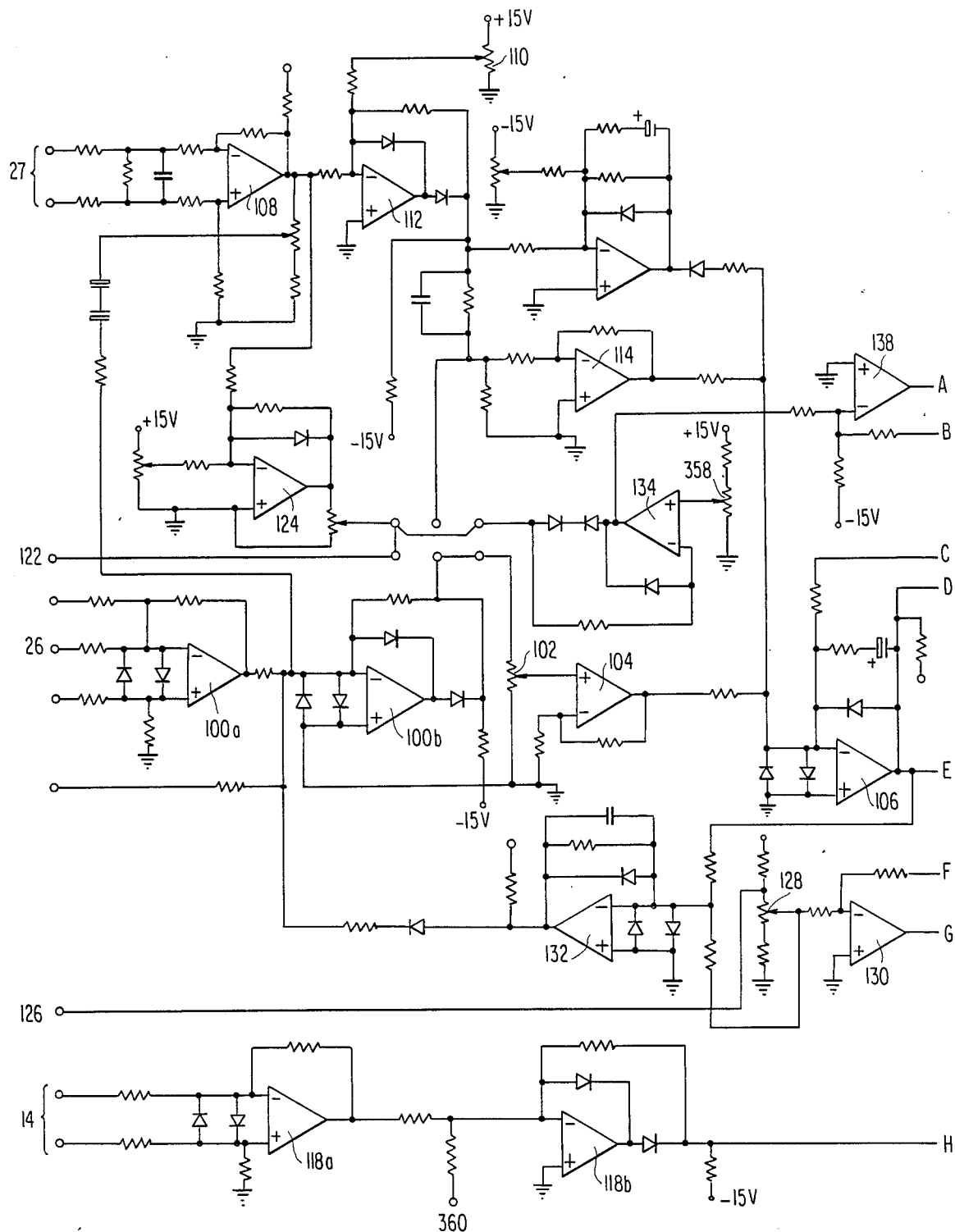
FIGS. 2a and 2b illustrates schematically the regulator shown in FIG. 1.
Figure 2B:
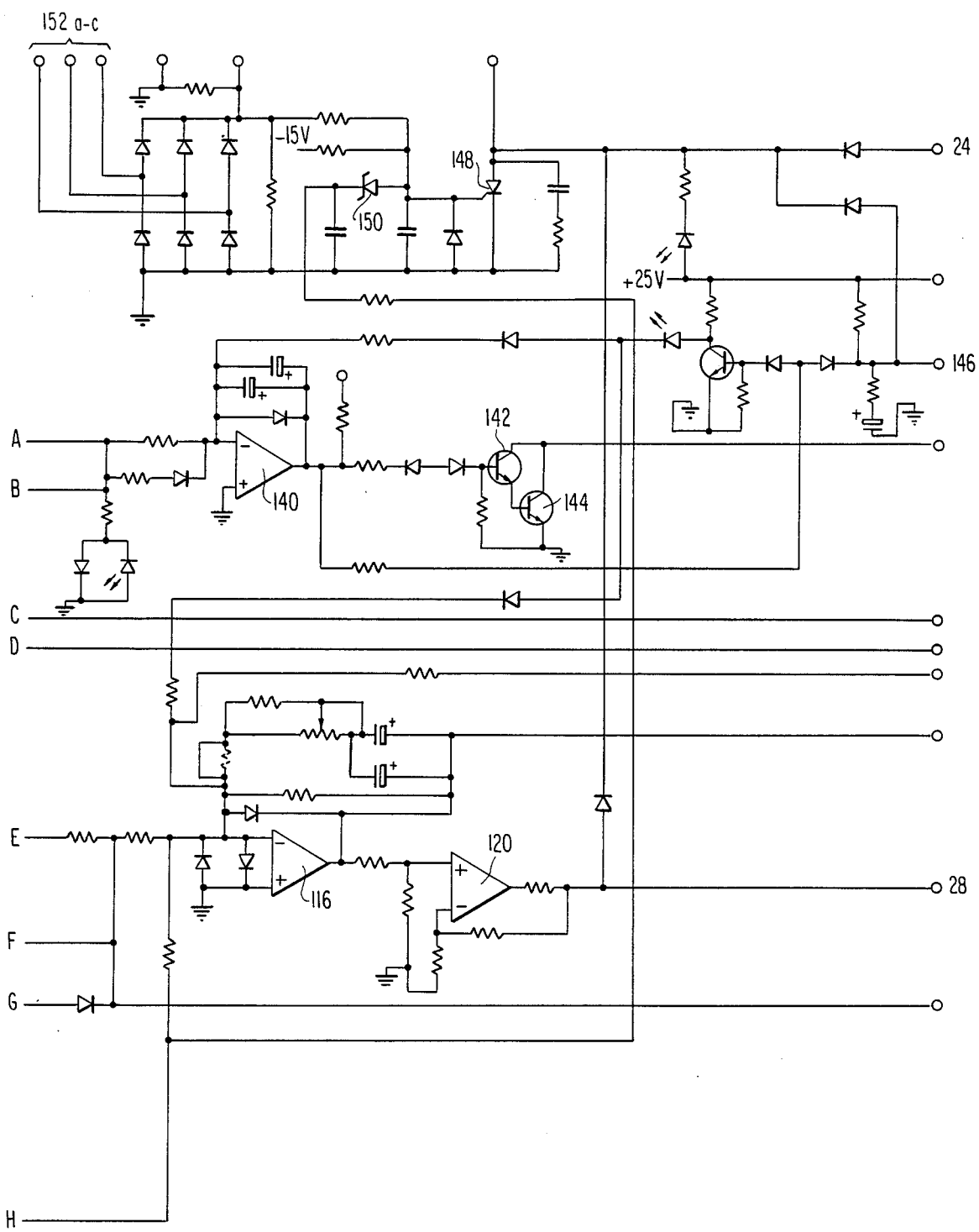

Turning next to FIGS. 2a–b, which are joined at points A–H, the regulator 18 is shown in detailed schematic form. Although substantially all components of the regulator have been shown, only those which are important to an understanding of the present invention will be discussed. The regulator 18 comprises a voltage control loop and a current control loop. The voltage control loop maintains the correct output voltage, and provides a reference against which the current loop functions.

To perform its essential functions for purposes of the present invention, three primary inputs are required. The first input is the drive frequency reference signal 26, which is preferably a d.c. voltage in the range of 0–6 volts. The second input is feedback signal 27. representative of output voltage, which is also preferably a d.c. signal in the range of 0–6 volts. The feedback signal 27 is obtained in a conventional, electrically isolated manner. The third input 14, reflecting the current demand on the rectifier 10, is derived by a Hall effect DCCT from the output of the rectifier and is preferably a current proportional signal.

With respect to the voltage control loop, the signal 26 is twice inverted by means of inverter amplifiers 100a–b. The output of the inverter 100b is then supplied to a variable resistor 102, which may be referred to as the volts/hertz potentiometer. By varying the position of the wiper arm of the resistor 102, a desired percentage of the frequency reference signal may be supplied to a V/hz reference amp 104. The output of the amp 104, which is always positive, is then supplied to the inverting input of a voltage error amp 106, which is connected in the integrating summing mode.

The voltage feedback signal 27 is inverted by an amplifier 108, and then summed with a variable boost voltage from a variable resistor 110 in an amplifier 112. The output of the amplifier 112 is then inverted again by an amplifier 114, which in turn provides the remaining input to the amplifier 106. It will be appreciated that the output of amplifier 114 goes more negative as the feedback signal 27 increases, and thus amplifier 106 compares the conditioned voltage feedback signal with a V/Hz reference signal. When the reference and conditioned feedback signals are equal, the output of the amplifier 106 remains constant. However, if the inputs become unbalanced, the output of the amplifier 106 ramps up or down depending upon the state of the inputs.

The output voltage from the amplifier 106 will always be slightly negative, and serves as a current reference input to a current error amplifier 116. The amplifier 116 operates in a manner similar to the amplifier 106 and integrates the difference between the reference signal derived from amplifier 106 and the current feedback signal on line 14, which is supplied to the amplifier 116 through a pair of conditioning amplifiers 118a–b. The output of the amplifier 116, which is always positive, is amplified by non-inverting amplifier 120, which provides the output on line 28 (FIG. 1) that controls the phase angle of the SCRs of the rectifier 10.

During normal operation, the regulator 18 will be responsive to requests for acceleration or deceleration. In the event a request for an increase in speed is received, the signal on reference signal 26 increases, which causes the output signal from amplifier 104 to increase. This causes the amp 106 to detect an error since the signal from amp 104 is more positive than the signal from amp 114 is negative, which causes amp 106 to ramp in the negative direction.

As the output of amp 106 ramps negative, amp 116 goes positive as long as the current feedback signal 14 does not change significantly. This in turn makes the output of amplifier 120 go more positive, causing an increase in the conduction angle of the SCRs in the rectifier 10 (FIG. 1), increasing the output voltage.

With an increase in the output voltage, the voltage feedback signal on line 27 also increases, causing the output of the error amplifier 114 to go progressively more negative until equilibrium is reached at the amplifier 106. In addition, the signal on a line 122 will also increase due to amplifiers 108 and 124. The signal on the line 122 is provided to the oscillator 22 in a manner described hereinafter, and controls the oscillator frequency. Thus the increasing signal on line 122 ensures that an increase in output voltage is accompanied by a corresponding increasing in frequency, to maintain proper flux.

Similarly, the current limit loop operates to ensure proper operation. Thus, as d.c. current demanded from the rectifier 10 increases, the feedback signal 14 causes an increase in the signal at amplifier 116. The resulting imbalance causes a decrease in the output of the amp 116, which causes a decrease in the voltage level on line 28, phasing back the rectifier SCRs. This in turn causes the voltage feedback signal 27 to decrease, and amp 106 senses an imbalance. The output of amp 106 therefore goes more negative, with the result that amp 116 sees a changing current reference, eventually yielding equilibrium. However, and importantly, the increased current has resulted only in a change in current reference level, while maintaining a constant output voltage.

In the event the system is placed in an overcurrent condition, a point will be reached where the output from amp 106 is sufficiently negative to overcome a current limit reference established by an external input 126 and a variable resistor 128, which are provided to the amp 106 through a current limit clamp amplifier 130. In addition, a frequency limit amplifier 132 is activated, which reduces the voltage reference, proportional to frequency, across the variable resistor 102. a nearly balanced condition at the amplifier 106 is maintained. In the event the overcurrent condition continues for an extended period, a low frequency clamping amplifier 134 is activated in accordance with the setting of a variable resistor 358. This clamps the voltage on output 122, and also activates amplifier 138. This causes integrator 140, which has a relatively long time constant such as twenty seconds, to ramp up and eventually turn on transistors 142 and 144. When transistors 142 and 144 turn on, the output 24 is placed at zero volts, providing an indication that an overcurrent condition has occurred; in addition, the output 28 is held at zero volts, causing the SCRs to be completely phased back.

Each time the system is stopped, an input 146 is placed at zero volts, which resets the integrator 140 and also ensures that the input to amplifier 116 is held to a level which causes the output 28 to keep the SCRs in a phased back condition pending the next start. A similar overcurrent circuit, which responds to more rapid overcurrent conditions of greater magnitude, comprises an SCR 148, zener diode 150 and associated components and detects instantaneous three-phase conditions at inputs 152a-c.

Figure 3:
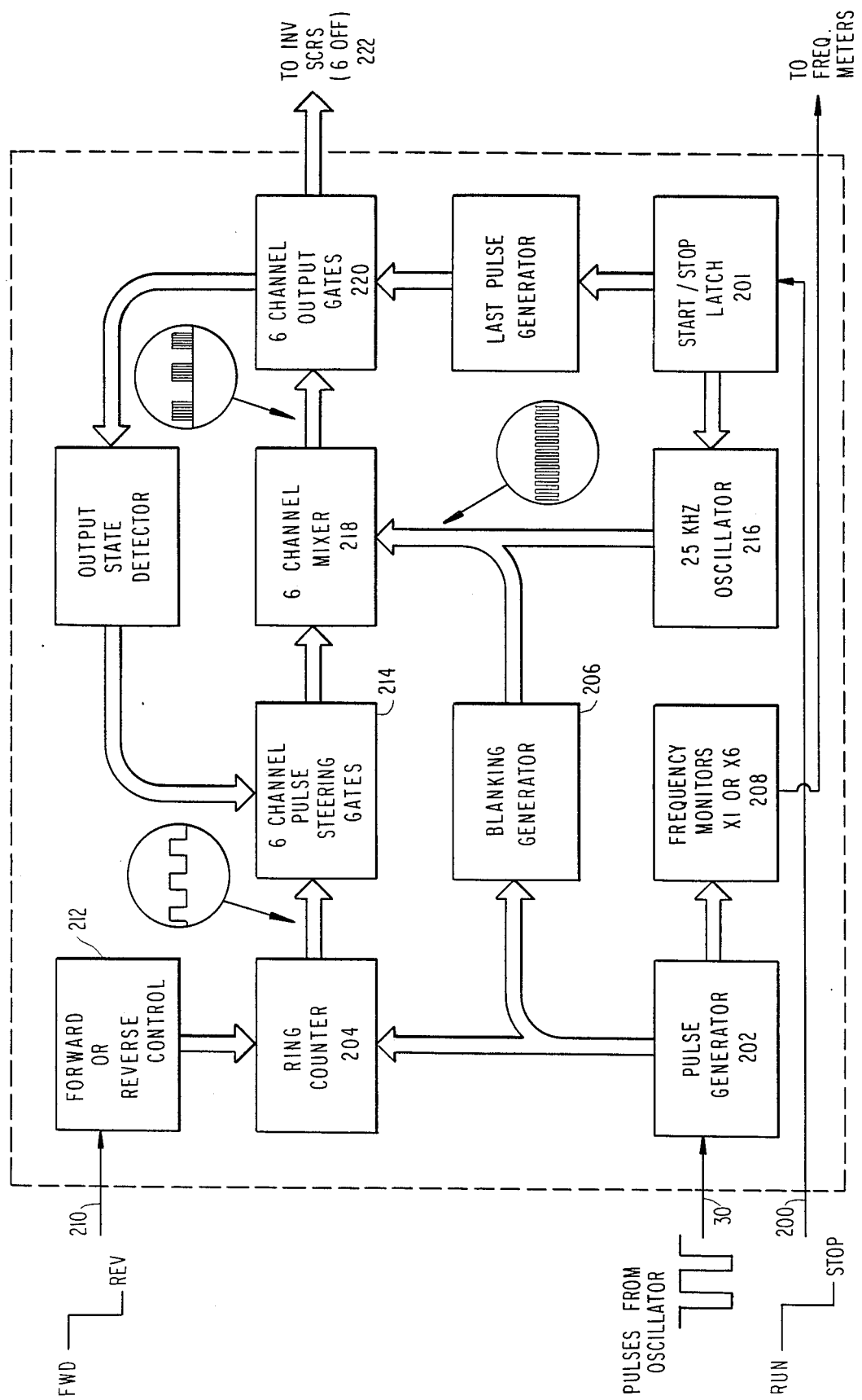

Turning next to FIG. 3, the substantially conventional inverter driver is shown in schematic block diagram form. The inverter driver functions to provide gate drive signals to the inverter thyristors in the sequence necessary to produce a three phase waveform. On receipt of a system start signal on run/stop line 154 and start/stop latch 156, the inverter driver operates on pulses from the oscillator 22 which are fed to a pulse generator 158 which is comprised of Schmitt triggers to increase rise and fall times and provide noise immunity, together with a monostable circuit for providing a fixed width output pulse.

The output of the pulse generator provides a clock pulse for logic sequencing of a ring counter 160, as well as providing signals to a blanking generator 162 and a frequency monitor 164. The frequency monitor 164 is provided in the event remote connection of counting circuits is provided. Depending upon the state of the forward/reverse control input 166 and associated bistable circuit 168, the contents of the ring counter 160 continually circulates, dividing down the input clock rate to provide pulses to fire the pulse steering gates 170 for the inverter thyristors When the start/stop latch 156 is placed in the start state, an oscillator 172 begins operation, and together with the dead band oscillator 162 provides a pulse train into a six channel mixer 174. The pulse train from the oscillator 172 thus modulates the square wave from the steering gates 170, which are also provided to the mixer 174. The result is provided to the output gates 176, which control the inverter SCRs 178 necessary for three phase operation.

When a stop signal is provided on line 154, a last pulse generator 180 and output state detector 182 operate to return the logic to the proper states so that all three phases stay in the same state, with either all high or all low SCRs on.

Figure 4A:
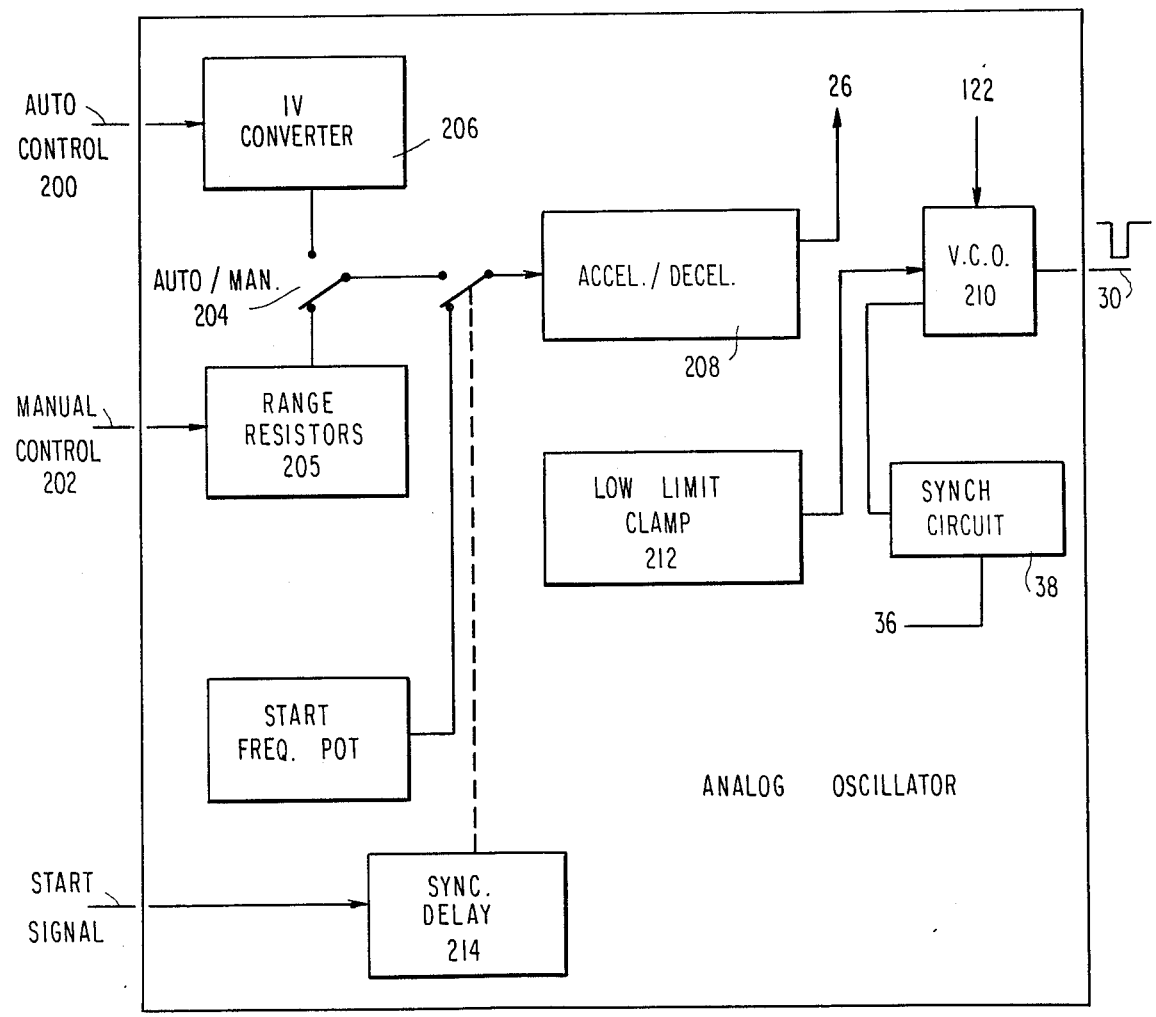
FIG. 4a illustrates in schematic block diagram form the oscillator of FIG. 1, while FIGS. 4b and 4c schematically illustrate the oscillator in greater detail.
Figure 4B:
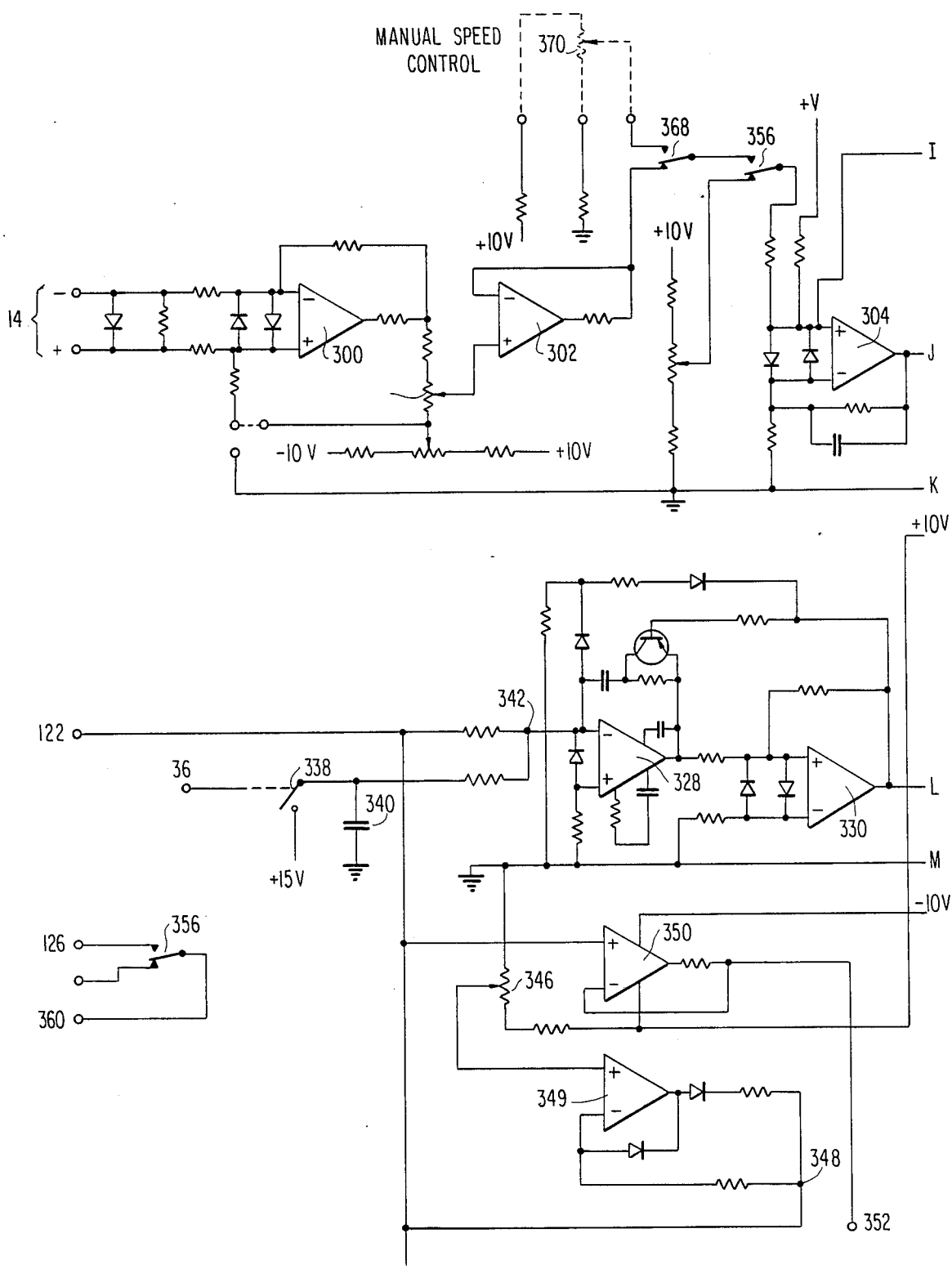
Figure 4C:
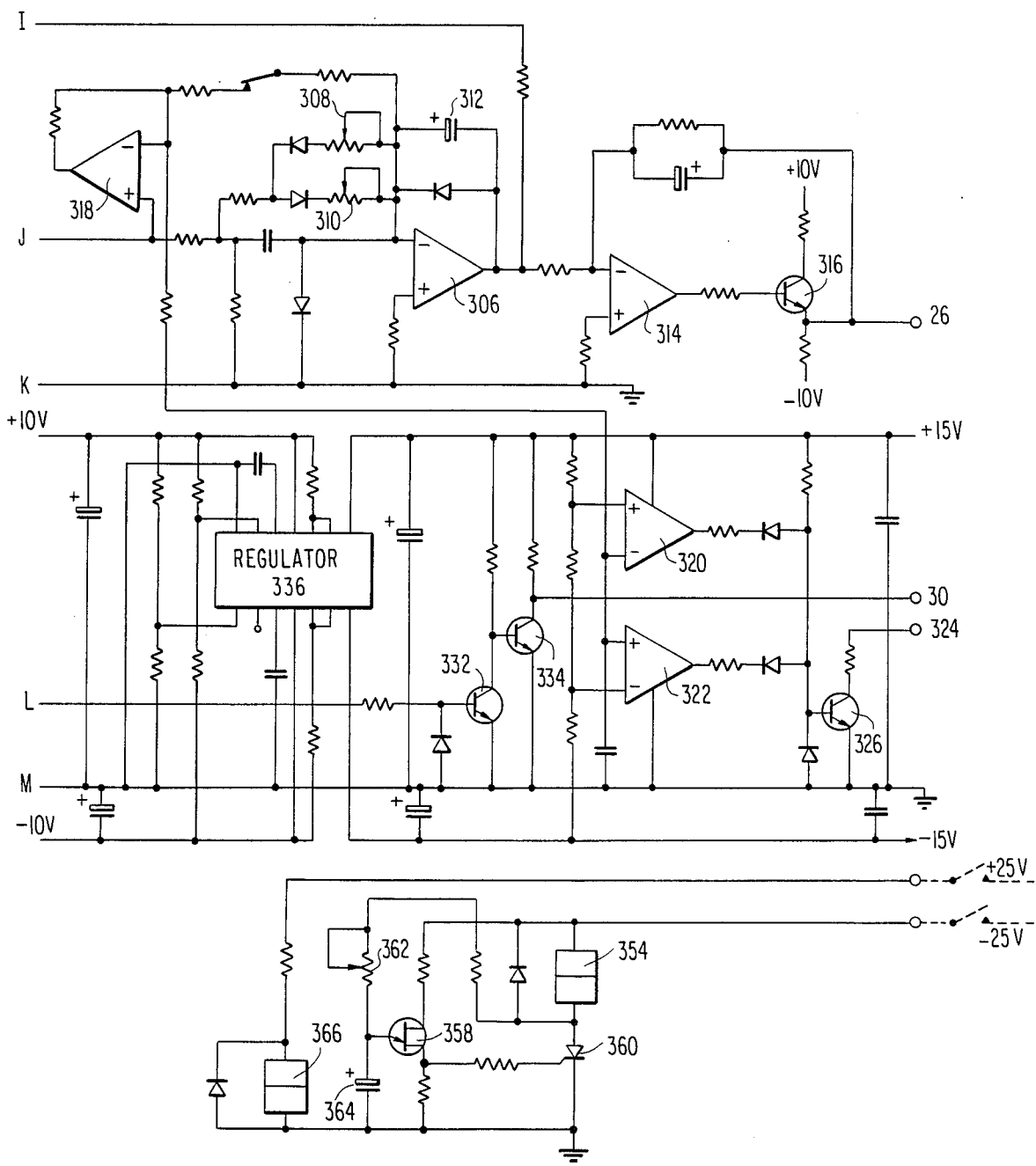

Turning next to FIGS. 4a–4c, the oscillator 22 of FIG. 1 is shown in schematic block diagram form in FIG. 4a, and is shown in more detailed schematic form in FIGS. 4b–4c. Also included in the synchronization circuit 38 (FIG. 1). The primary function of the oscillator, as discussed above, is to control the speed of the motor(s) 30 by providing a variable frequency pulse rate to the inverter 20. The rate of frequency change is determined by the requirements of the inverter motor load irrespective of the speed at which the frequency control is changed, as will be better appreciated from the following.

Referring particularly to FIG. 4a, an accelerate/decelerate control signal input to the oscillator is provided at inputs 200 and 202, depending respectively upon whether automatic or manual control is implemented at switches 204. Manual control is provided through range resistors 205. If automatic control is used, current-voltage converter circuit 206 converts the control signal into a control voltage in accordance with the appropriate frequency range. The control voltage is supplied to a linear accelerate/decelerate circuit 208 which determines the rate of change of output voltage and provides that voltage signal to the regulator 18 (FIG. 1). The regulator in turn supplies a speed control signal on line 122 (or line 29 in FIG. 1) to a voltage controlled oscillator 210 which as a basic rate of change preferably on the order of 240 Hz per volt of input. The output of the VCO 210 is provided on the line 30.

The voltage controlled oscillator 210 also receives an input from a low limit clamping circuit 212 to prevent the control voltage from falling below a predetermined minimum, as discussed in greater detail above in connection with the regulator 18. Also, a synch delay circuit 214 is provided in the event two speed operation is desired, with the synch signal being responsive to a system start signal as discussed in connection with the inverter 20. In addition, the synchronization signal 36 is provided to the synchronization circuit 38, which in turn provides another input to the VCO 210 to cause the frequency to be maintained at a maximum when the inverter is to be connected to a rotating motor.

Referring next to FIGS. 4b and 4c, the control input 14 is provided to signal conditioning amplifiers 300 and 302, which convert the control signal into a control voltage as described above. The conditioned signal is then provided to amplifiers 304 and 306 which, together with their associated components, form the linear accelerate/decelerate circuit 208. The rate of change of output voltage is determined by variable resistors 308 and 310, which respectively control the rate of acceleration and deceleration when taken together with capacitor 312. The output of the amplifier 306 is inverted by an amplifier 314, whose output is in turn buffered by a transistor 316. The output of the transistor 316 provides the reference signal 26 to the regulator 18 as discussed above in connection with FIGS. 2a-b. In addition, an amplifier 318 acts as a voltage buffer to provide an accelerate/decelerate sense signal to amplifiers 320 and 322, which in turn provide an accelerate/decelerate sense output at line 324 through buffering transistor 326. Approximately zero volts on the output 324 indicates that set speed has been reached.

The frequency control output of the regulator 18 is provided on the line 122 as discussed in connection with FIGS. 2a-b, and serves as the input to a voltage control oscillator comprised of amplifiers 328 and 330, together with their associated components. As noted above, the basic rate of change is 240 Hz per input volt. The output of the amplifier 330 is amplified by the transistors 332 and 334 to provide the primary output of the oscillator 22 on the line 30. Supply voltages for certain portions of the circuit are supplied by a dual tracking regulator 336.

During synchronization of the system with a free running motor 30, a signal on the input 36 connects switch 338 to a high voltage, which causes a capacitor 340 to be rapidly charged. This impresses a high voltage on the input to the VCO amplifier 328 at the summing junction 342, thereby holding the oscillator output 30 at the maximum. In turn, the current limit of the regulator 18 is activated, keeping the current supplied by the rectifier 10 at a low level. The inverter 20 is then connected to the already rotating motor by means of output switches 33.

As the stored charge on the capacitor 340 dissipates, the voltage impressed on the amplifier 328 diminishes and the output pulse rate slows. However, because the impedance of the motor 30 is low, no significant changes occur as discussed in connection with FIG. 1.

Once the output frequency reaches a level equal to the rotational speed. Of the motor 30, however, the impedance of the motor 30 increases substantially. The current in the motor falls and the voltage builds upon the output of the inverter to establish full fluse in the motor. The voltage on the inverter D.C. bus rises causing the voltage at line 122 to increase to a level greater than that provided by the capacitor 340. The voltage on the line 122 thus controls the operation of the motor, and the capacitor 340 discharges completely. As a result, the system has been smoothly connected to the rotating motor, achieving the desired results.

The low frequency limit clamp circuit 212 is implemented by means of an amplifier 349, where the actual clamp point is determined by the setting of variable resistor 346. The output of the amplifier 349 is provided to the input line 122 on a line 348, thus impressing the limit signal on the VCO amplifiers 328 and 330. An amplifier 350 provides at output 352 a buffered analog voltage equal to the input voltage for the oscillator section, for use with external meters or other devices.

The relay 366 and associated contacts 368 select the input to the linear accel/decel circuit from either the potentiometer 370, which may be motorized, or the control signal conditioner circuit from amplifier 302.

Having disclosed in detail an exemplary embodiment of the present invention, which can be seen to provide an uncomplicated but effective solution to what has previously been regarded as a difficult problem, it will be appreciated by those skilled in the art that numerous alternatives and equivalents exist which do not depart from the invention and are intended to be included in the appended claims.

We claim:

1. A method of attaching a free running induction motor to an inverter which characteristically outputs a variable-frequency waveform for driving the motor, said method comprising the steps of:
   establishing the frequency of the variable-frequency waveform output from the inverter at a level exceeding the rotational speed of the motor,
   establishing a current limit for the inverter,
   connecting the inverter to the free running motor,
   lowering the frequency of the variable-frequency waveform output from the inverter at a controlled rate while permitting the voltage level of the variable frequency waveform to drop until the frequency of the variable-frequency waveform is substantially equal to the rotational speed of the motor, and
   allowing the output voltage of the inverter to rise and provide primary power to the motor.

2. Apparatus for connecting a free running induction motor to an inverter which characteristically outputs a variable-frequency waveform to drive the motor at a voltage level dependent upon the frequency of the variable-frequency waveform, said apparatus comprising:
   oscillator means connected to the inverter for causing the inverter to output the variable-frequency waveform, said oscillator means including a first circuit means operable to generate a variable-frequency pulse signal which determines the frequency of said variable-frequency waveform;
   regulator means for supplying said first circuit means of said oscillator means with a control signal which governs the operation of said first circuit means as a function of the voltage level of said variable-frequency waveform and for limiting the current level of said variable-frequency waveform to a relatively low value during connection of the inverter to the motor; and
   synchronization means connected to said oscillator means for causing said first circuit means to generate said variable-frequency pulse signal at a high pulse rate which establishes the frequency of said variable-frequency waveform at a level exceeding the rotational speed of the motor, said synchronization means including a switching means for connecting the inverter to the motor when said first circuit means is generating said variable-frequency pulse signal at said high pulse rate and a discharge means for lowering the frequency of said variable-frequency pulse signal while permitting the voltage level of the variable-frequency waveform to drop until the frequency of said variable-frequency waveform reaches a level substantially equal to the rotational speed of the motor; whereupon the impedence of the motor increases substantially to allow the voltage level of the variable-frequency waveform to rise.

3. An apparatus as set forth in claim 2, wherein said first circuit means of said oscillator means includes a voltage-controlled oscillator which generates said variable-frequency pulse signal and said regulator means includes a means for controlling the voltage-controlled oscillator in response to changes in the voltage level of said variable-frequency waveform.

4. An apparatus as set forth in claim 3, wherein said discharge means is connected to said voltage-controlled oscillator and said synchronization means further includes a high voltage source connectable to said discharge means for charging said discharge means to a level sufficient for causing said voltage-controlled oscillator to generate said variable-frequency pulse signal at said high pulse rate.

5. An apparatus as set forth in claim 4, wherein said discharge means includes a capacitor and a switch for connecting said high voltage source to said capacitor.

6. An apparatus as set forth in claim 2, wherein said regulator means includes a current limit clamp circuit.

7. Apparatus as set forth in claim 2 wherein the inverter is driven by a rectifier which outputs D.C. voltage and D. C. current under the control of said regulator means and said regulator means further includes a current limit clamp circuit which functions to limit the level of said D.C. current output from the rectifier during connection of the inverter to the motor.

* * * * *